United States Patent
Bowers, III

(10) Patent No.: US 11,499,889 B1
(45) Date of Patent: Nov. 15, 2022

(54) FAULT FREQUENCY MATCHING OF PERIODIC PEAKS IN SPECTRAL MACHINE DATA

(71) Applicant: Computational Systems, Inc., Knoxville, TN (US)

(72) Inventor: Stewart V. Bowers, III, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 0 days.

(21) Appl. No.: 17/472,090

(22) Filed: Sep. 10, 2021

(51) Int. Cl.
| | | |
|---|---|---|
| G01M 13/045 | (2019.01) | |
| F16C 19/52 | (2006.01) | |
| G01M 13/021 | (2019.01) | |

(52) U.S. Cl.
CPC ......... G01M 13/045 (2013.01); F16C 19/527 (2013.01); G01M 13/021 (2013.01)

(58) Field of Classification Search
None
See application file for complete search history.

(56) References Cited

U.S. PATENT DOCUMENTS

| | | |
|---|---|---|
| 5,895,857 A | 4/1999 | Robinson et al. |
| 5,943,634 A | 8/1999 | Piety et al. |
| 6,389,887 B1 | 5/2002 | Dusserre-Telmon et al. |
| 6,408,696 B1 | 6/2002 | Jong |
| 6,526,831 B2 | 3/2003 | Ben-Romdhane |

(Continued)

FOREIGN PATENT DOCUMENTS

| | | |
|---|---|---|
| CN | 102798529 A | 11/2012 |
| CN | 107631877 A | 1/2018 |

(Continued)

OTHER PUBLICATIONS

Flowserve Corporation; IPS Wireless Auto Vibration Analysis Eight Peaks; Services and Solutions Asset Management and Optimization; FSG-115a (E/A4) Oct. 2014 Flowserve Corporation; 2 pages.

*Primary Examiner* — Raul J Rios Russo
*Assistant Examiner* — Carl F. R. Tchatchouang
(74) *Attorney, Agent, or Firm* — Luedeka Neely Group, P.C.

(57) ABSTRACT

A computer-implemented method analyzes periodic information in digital vibration data associated with a machine. The method involves generating a spectral periodic information plot (PIP) based on the digital vibration data, and locating amplitude peaks in the PIP at frequencies associated with fundamental frequencies of interest. Peaks occurring at fundamental fault frequencies and at related harmonic frequencies are removed from the PIP, while retaining energy values associated with the removed peaks. Remaining peaks in the PIP are classified as synchronous periodic peaks and non-synchronous periodic peaks. The remaining peaks in the PIP are graphically plotted along with the fault frequencies and related harmonic frequencies in different colors or different line styles on a display device to identify different groups of frequencies of interest. The method implements an algorithm that locates peaks in the PIP at frequencies associated with the fundamental frequencies of interest even though frequencies of the located peaks do not precisely match the fundamental frequencies of interest.

17 Claims, 12 Drawing Sheets

(56) References Cited

U.S. PATENT DOCUMENTS

| | | | |
|---|---|---|---|
| 6,618,128 B2 | 9/2003 | Voorhis et al. | |
| 6,651,012 B1 | 11/2003 | Bechhoefer | |
| 6,792,360 B2 * | 9/2004 | Smulders | G01M 7/02 73/579 |
| 6,802,221 B2 | 10/2004 | Hedeen et al. | |
| 7,010,445 B2 | 3/2006 | Battenberg et al. | |
| 7,133,801 B2 | 11/2006 | Song | |
| 7,136,794 B1 | 11/2006 | Bechhoefer | |
| 7,194,383 B2 | 3/2007 | Clarke et al. | |
| 7,930,111 B2 | 4/2011 | Luo et al. | |
| 9,091,588 B2 | 7/2015 | Lefler | |
| 9,405,291 B2 | 8/2016 | Sharp, Jr. et al. | |
| 9,645,046 B2 | 5/2017 | Zhang et al. | |
| 9,791,422 B2 | 10/2017 | Bowers, III et al. | |
| 9,791,856 B2 | 10/2017 | Hatch et al. | |
| 9,989,439 B2 | 6/2018 | Thomson | |
| 10,416,126 B2 | 9/2019 | Bowers, III et al. | |
| 11,002,641 B2 * | 5/2021 | Bowers, III | G01M 99/005 |
| 11,300,482 B2 | 4/2022 | Bowers, III et al. | |
| 2002/0139191 A1 | 10/2002 | Hedeen et al. | |
| 2003/0065482 A1 | 4/2003 | Bechhoefer | |
| 2011/0098968 A1 | 4/2011 | Srinivasa et al. | |
| 2011/0290024 A1 | 12/2011 | Lefler | |
| 2013/0063262 A1 | 3/2013 | Shaikh et al. | |
| 2014/0214363 A1 | 7/2014 | Hatch et al. | |
| 2014/0324367 A1 | 10/2014 | Garvey, III et al. | |
| 2015/0012247 A1 | 1/2015 | Bowers, III et al. | |
| 2017/0030349 A1 | 2/2017 | Bassett et al. | |
| 2021/0041329 A1 * | 2/2021 | Bowers, III | G05B 19/4065 |

FOREIGN PATENT DOCUMENTS

| | | |
|---|---|---|
| EP | 1097363 B1 | 12/2007 |
| IN | 201621003344 | 1/2016 |
| WO | 2012172369 A2 | 12/2012 |
| WO | 2017145222 A1 | 8/2017 |

\* cited by examiner

Process for Finding Fundamental Frequency of Interest (FOI)

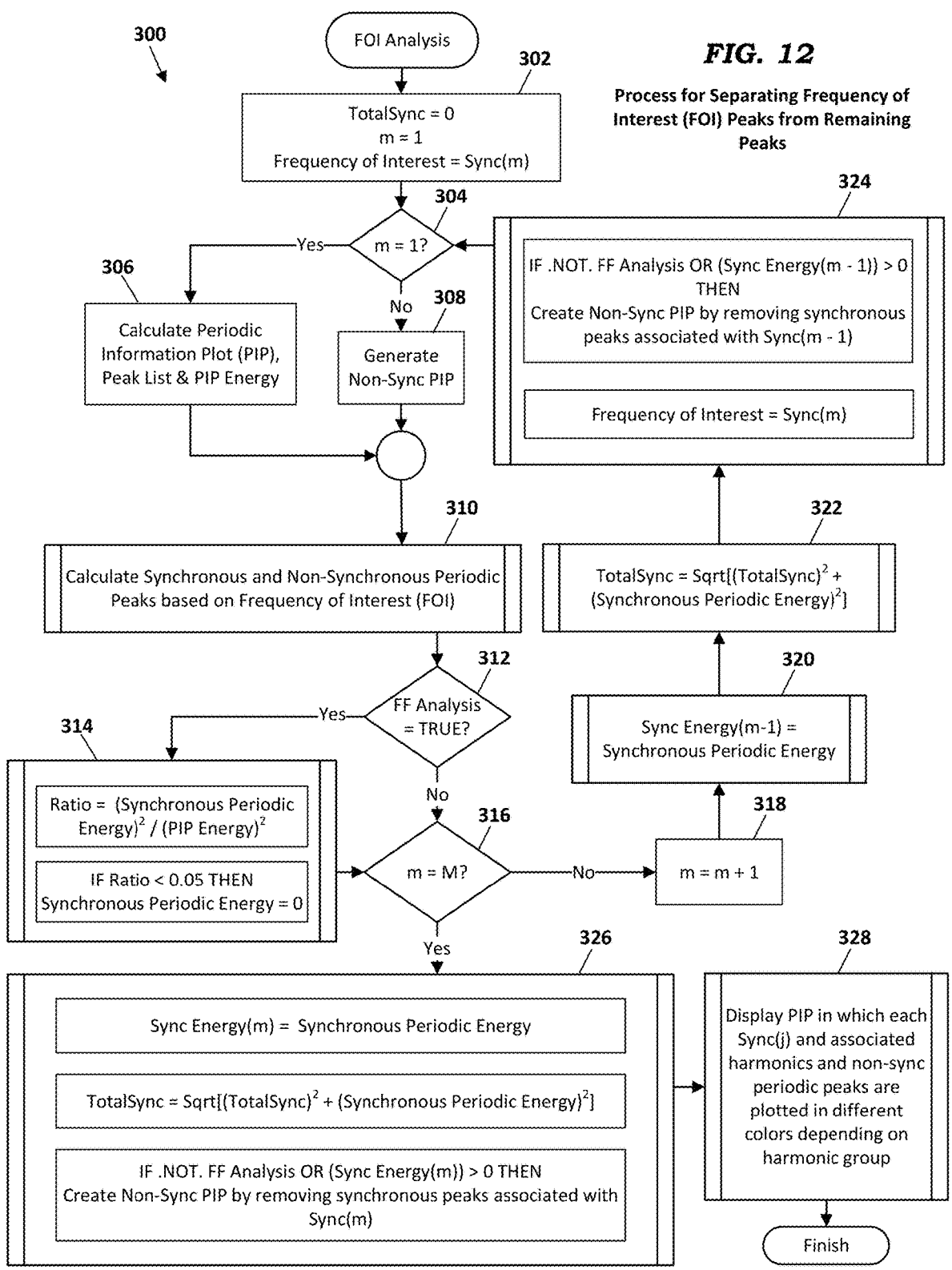

FAULT FREQUENCY MATCHING OF PERIODIC PEAKS IN SPECTRAL MACHINE DATA

FIELD

This invention relates to analysis of signals. More particularly, this invention relates to a system for separating periodic amplitude peaks from nonperiodic amplitude peaks in machine vibration data.

BACKGROUND

Fault frequencies are frequency values associated with amplitude peaks in spectral machine vibration data that are indicative of mechanical or electrical characteristics of a machine. There is a set of fault frequencies related to each bearing in the machine. Each set of bearing fault frequencies includes a fundamental frequency and harmonics of the fundamental frequency. When a machine vibration analyst views a line or other marker corresponding to a particular fault frequency that is overlaid on a vibration spectrum, the analyst can visually determine whether spectral peaks in the spectrum align with the pattern of the particular fault frequency. An example of this is shown in FIG. 2, which depicts a spectral display that includes markers associated with a set of bearing outer race (BPFO) fault frequencies overlaid on a frequency spectrum that indicates a BPFO fault. The markers are the vertical dotted lines evenly distributed across the spectrum.

As indicated in FIG. 2, the fundamental fault frequency marker (lowest frequency marker) and the fundamental spectral peak appear to match. However, the harmonic peaks separate from the other markers as the harmonic peak frequency increases. Even though the fault frequency markers do not precisely match the actual spectral frequencies, an experienced analyst viewing this data would know a bearing (BPFO) fault is present.

This analysis becomes more difficult if an algorithm—rather than an experienced human analyst—is deciding whether particular fault frequency markers (fundamental and harmonics) match particular measured spectral peaks. Matching a fault frequency marker with a measured spectral peak depends on how close the frequency of the marker should be to the corresponding frequency of the spectral peak. FIG. 3 depicts a zoomed-in view around the largest amplitude spectral peak in FIG. 2. Even though the fundamental fault frequency marker appears to align with the largest amplitude peak in FIG. 2, the frequency values actually differ as shown in FIG. 3. This difference grows larger for the higher-frequency harmonic values of the fundamental. Therefore, for automated analysis, initially only the fundamental fault is analyzed for a match.

What is needed, therefore, is an improved process for matching vibration spectral peaks associated with the harmonics of fault frequencies with the expected (marker) frequencies of those harmonics.

SUMMARY

The processes described herein can be applied to any vibration spectrum. However, finding fault frequency harmonic peaks is enhanced—making the matching processes more efficient—if the matching processes are applied to a Periodic Information Plot (PIP) as described in U.S. Pat. No. 10,416,126. In the PIP, the locations of the harmonic peaks are easier to recognize because most noise peaks have been eliminated, thereby providing fewer choices for matches.

In the matching processes described herein, it is desirable to isolate frequencies of interest (FOI) from each other for analysis. As the term is used herein, a "frequency of interest" consists of a fundamental frequency peak along with harmonic frequency peaks, if applicable. Each FOI is either synchronous periodic (i.e., running speed, gear mesh) or non-synchronous periodic (i.e., bearing fault, belt frequencies, hunting tooth). A typical feature of the PIP is that each FOI is plotted in a different color or line style from other FOI's, thereby making it easier for a human analyst to distinguish between the different FOI's displayed in the plot.

It will be appreciated that each FOI can be considered a form of a fault frequency. It is very important to differentiate between a shaft speed frequency and a bearing fault frequency that may be a multiple of the shaft speed. Fault frequencies related to synchronous periodic signals may be calculated based on speed detection, such as using a speed algorithm, or based on an inputted speed value associated with the expected shaft speed. Fault frequencies related to non-synchronous periodic signals may be calculated based on an associated speed, and are processed differently as described in more detail hereinafter. Non-synchronous periodic fault frequencies, such as bearing fault frequencies, may be found using the same methods used for locating shaft speed and other synchronous periodic frequencies. In preferred embodiments described herein, bearing fault frequencies are treated as synchronous periodic frequencies for purposes of finding the associated bearing fault frequency peaks and energy. Also in preferred embodiments, the bearing fault frequency energy is included in the calculation for the total non-synchronous periodic energy, not synchronous periodic energy. This total non-synchronous periodic energy is incorporated in calculating the severity of the mechanical fault (bearing fault) as described in U.S. Pat. No. 10,416,126.

FIG. 4 depicts a PIP of a non-gearbox asset with unknown bearing characteristics. The PIP preferably shows the synchronous periodic peaks related to the running speed plotted in dashed lines and the non-synchronous peaks plotted in solid lines. For gearboxes, such as depicted in FIG. 5, the synchronous periodic peaks include all shaft speeds and associated hunting tooth frequencies (plotted in dashed lines). As shown in FIG. 5, the non-synchronous peaks may be plotted in solid lines.

Bearing fault frequency values can be applied to non-synchronous periodic peaks in a PIP to determine the precise bearing fault frequencies, such as Ball Pass Frequency of the Inner race (BPFI), Ball Pass Frequency of the Outer race (BPFO), Ball Spin Frequency (BSF), and Fundamental Train Frequency (FTF—also known as cage). A BPFO fault is indicated in the PIP of FIG. 6 (bold dashed-line peak), which was determined by applying the known bearing fault frequencies to the results shown in FIG. 4. Similarly, a BPFO fault is indicated in the PIP of FIG. 7 (bold solid-line peaks) by applying the bearing fault frequencies to the gearbox analysis shown in FIG. 5. The fault frequencies for consideration in the PIP of FIG. 7 are indicated in the bearing information listed the lower left corner. Each of these frequency groups (if present in the spectrum) may be plotted with different colors or line styles in the PIP. The process for matching the fault frequencies with the PIP peaks is described in more detail hereinafter.

Another issue that makes detection of fault frequency patterns more difficult is related to resolution and the ability to differentiate a harmonic of the running speed from the fundamental frequency of a fault frequency. Many times, the fundamental of a fault frequency, such as a bearing fault frequency, will be very close to that of a running speed harmonic. Such is the case with the bearing analysis depicted in FIG. 8. The BPFI frequency for this bearing is 7.054 times the running speed, while the BPFO frequency is 4.946 times the running speed. With insufficient resolution, it is difficult to distinguish the 7 times the running speed from the 7.054 times the running speed associated with the BPFI frequency.

In preferred embodiments described herein, the algorithm for finding FOI fault frequencies first determines the speed of the associated shaft, and then finds all fundamental FOI (bearing fault frequencies in this example) matching peak(s) in the PIP. All harmonics of the fundamental bearing fault frequencies found are preferably located and removed from the PIP before the remaining peaks in the PIP are characterized as speed-related and/or gearbox-related. Results of the algorithm that separates bearing fault frequencies associated with FIG. 8 are depicted in FIG. 9. It should be noted that the largest peak in FIG. 8 is now characterized as the fundamental of BPFI as depicted in FIG. 9. The bearing information in the lower left corner of FIG. 9 indicates the fault frequency fundamental associated with the particular fault, and the energies of each FOI group of peaks are adjusted accordingly. The detailed description that follows provides further detail regarding the process for finding fault frequencies and producing the plot depicted in FIG. 9.

One preferred embodiment is directed to an apparatus for acquiring and analyzing periodic information in machine vibration. The apparatus includes a vibration sensor, a data collector and a processor. The vibration sensor is securely attached to the machine in a location providing a solid transmission path from a source of vibration within the machine to the vibration sensor. The data collector includes an analog-to-digital converter that receives a vibration signal from the sensor and converts the vibration signal to digital vibration data. The data collector also includes memory for buffering the digital vibration data.

The processor executes operational instructions to process the digital vibration data, including instructions that:
- determine a rotational speed of a rotational component of the machine;
- generate a vibration waveform based on the digital vibration data;
- generate a spectral periodic information plot based on the digital vibration data;
- locate amplitude peaks in the periodic information plot at frequencies associated with fundamental frequencies of interest associated with a fundamental frequency of a fault frequency family of peaks;
- remove amplitude peaks at fundamental fault frequencies and at related harmonic frequencies from the periodic information plot;
- classify remaining amplitude peaks in the periodic information plot as synchronous periodic peaks and non-synchronous periodic peaks; and
- graphically plot the fault frequency family of peaks and the remaining amplitude peaks in the periodic information plot in different colors or different line styles on a display device to identify different groups of frequencies of interest.

In some embodiments, the processor retains non-synchronous energy values associated with the removed amplitude peaks, calculates a non-synchronous periodic energy value associated with the non-synchronous periodic peaks, and displays the non-synchronous periodic energy value with the periodic information plot on the display device.

In some embodiments, the fault frequency family of peaks are associated with a bearing fault in the machine, and the processor calculates bearing fault severity based at least in part on the non-synchronous periodic energy value.

In some embodiments, the processor locates the amplitude peaks in the periodic information plot at frequencies associated with fundamental frequencies of interest even though the frequencies of the amplitude peaks do not precisely match the fundamental frequencies of interest.

In some embodiments, the processor locates each amplitude peak in the periodic information plot at a frequency associated with a fundamental frequency of interest by:
- determining a frequency difference between a frequency of the amplitude peak and a frequency associated with a corresponding fundamental frequency of interest;
- if the frequency difference is less than a predetermined difference value, designating the amplitude peak as a candidate for a match to the corresponding fundamental frequency of interest;
- calculating a percent energy value for the amplitude peak;
- if the percent energy value of the amplitude peak is greater than a predetermined percentage of a total energy of the periodic information plot, designating the amplitude peak as a candidate for a match to the corresponding fundamental frequency of interest; and
- choosing a candidate amplitude peak having a frequency closest to the fundamental frequency of interest as the fundamental fault frequency peak.

In some embodiments, the processor analyzes the amplitude peaks in the periodic information plot associated with the fundamental frequencies of interest to determine types of machine faults associated with the amplitude peaks, and displays information indicating the types of machine faults with the periodic information plot on the display device.

In some embodiments, the processor displays the information indicating the types of machine faults selected from the group consisting of Ball Pass Frequency of the Inner race (BPFI), Ball Pass Frequency of the Outer race (BPFO), Ball Spin Frequency (BSF), and Fundamental Train Frequency (FTF).

In some embodiments, the apparatus includes a data communication network to which the processor is connected and through which the periodic information plot is communicated. The apparatus also includes an analyst computer that receives the periodic information plot through the data communication network and displays the periodic information plot for viewing by an analyst.

In some embodiments, the data collector comprises a digital data recorder or a vibration data collector.

In some embodiments, the processor is a component of the data collector, while in other embodiments the processor is a component of an analyst computer that is in communication with the data collector via a communication network.

In another aspect, embodiments of the invention provide a computer-implemented method for acquiring and analyzing periodic information in machine vibration. In a preferred embodiment, the method includes:
(a) generating a vibration signal using a vibration sensor securely attached to the machine;
(b) converting the vibration signal to digital vibration data;
(c) determining a rotational speed of a rotational component of the machine;
(d) generating a vibration waveform based on the digital vibration data;

(e) generating a spectral periodic information plot based on the digital vibration data;

(f) locating amplitude peaks in the periodic information plot at frequencies associated with fundamental frequencies of interest associated with a fundamental frequency of a fault frequency family of peaks;

(g) removing amplitude peaks at fundamental fault frequencies and at related harmonic frequencies from the periodic information plot;

(h) classifying remaining amplitude peaks in the periodic information plot as synchronous periodic peaks and non-synchronous periodic peaks; and (i) graphically plotting the fault frequency family of peaks and the remaining amplitude peaks in the periodic information plot in different colors or different line styles on a display device to identify different groups of frequencies of interest.

In some embodiments, the method also includes:

(j) retaining non-synchronous energy values associated with the removed amplitude peaks;

(k) calculating a non-synchronous periodic energy value associated with the non-synchronous periodic peaks; and (l) displaying the non-synchronous periodic energy value with the periodic information plot on the display device.

In some embodiments, the fault frequency family of peaks are associated with a bearing fault in the machine, and the method further includes calculating bearing fault severity based at least in part on the non-synchronous periodic energy value.

In some embodiments, step (f) includes locating the amplitude peaks in the periodic information plot at frequencies associated with fundamental frequencies of interest even though the amplitude peaks in the periodic information plot do not precisely match the fundamental frequencies of interest. In such embodiments, step (f) includes, for each amplitude peak:

determining a frequency difference between a frequency of the amplitude peak and a frequency associated with a corresponding fundamental frequency of interest;

if the frequency difference is less than a predetermined difference value, designating the amplitude peak as a candidate for a match to the corresponding fundamental frequency of interest;

calculating a percent energy value for the amplitude peak;

if the percent energy value of the amplitude peak is greater than a predetermined percentage of a total energy of the periodic information plot, designating the amplitude peak as a candidate for a match to the corresponding fundamental frequency of interest; and choosing a candidate amplitude peak having a frequency closest to the fundamental frequency of interest as the fundamental fault frequency peak.

In some embodiments, the method includes:

(j) analyzing the amplitude peaks in the periodic information plot associated with the fundamental frequencies of interest to determine types of machine faults associated with the amplitude peaks; and (k) displaying information indicating the types of machine faults with the periodic information plot on the display device.

In some embodiments, step (k) includes displaying the information indicating the types of machine faults as one or more of Ball Pass Frequency of the Inner race (BPFI), Ball Pass Frequency of the Outer race (BPFO), Ball Spin Frequency (BSF), or Fundamental Train Frequency (FTF).

Following are definitions of various terms used in describing embodiments of the invention.

Fault Frequency: The frequency or family of frequencies associated with one or more amplitude peaks in vibration spectral data, wherein the one or more peaks are associated with mechanically-related faults in a machine Fault Frequency(m): A list of m number of fault frequencies in vibration spectral data Bearing Fault Frequency(m): A list of m number of fault frequencies in vibration spectral data associated with bearing-related faults Bearing FF Energy: Vibration energy of the amplitude peaks defined as the bearing fault frequency peaks Frequency of Interest (FOI): A fault frequency associated with a fault in a component of interest in the machine Nonsynchronous Periodic FOI: A frequency of interest associated with a nonsynchronous periodic peak that is indicative of a nonsynchronous periodic fault, such as a bearing or belt fault Nonsynchronous Periodic Energy: Vibration energy associated with nonsynchronous periodic peaks in a vibration spectrum Synchronous Periodic FOI: A frequency of interest associated with a synchronous periodic fault, such as associated with the machine running speed, or gear mesh frequencies Synchronous Periodic Energy: Vibration energy associated with synchronous periodic peaks in a vibration spectrum Sync(m): A list of m number of fault frequencies associated with synchronous periodic peaks, such as associated with the machine running speed, or gear mesh frequencies TotalSync: Energy of all synchronous peaks analyzed. When calculating a single synchronous value, such as speed or a single fault frequency, TotalSync is the energy of the fundamental value and its harmonics. For bearing analysis, there are four fault frequency "harmonic families" and TotalSync is the total energy of all four fault frequency families.

dfMult: A selectable delta frequency multiplier df: The frequency difference between two adjacent discrete bins in an FFT Periodic Information Plot (PIP): An amplitude versus frequency plot showing periodic frequencies derived from a waveform. This plot is produced by performing an autocorrelation on the waveform, and taking an FFT of the resulting autocorrelated waveform along with a percent periodicity energy prediction. Only the largest amplitude peaks from the autocorrelated FFT are retained. The energy of the largest amplitude peaks comprises the percent periodicity energy of the total energy of the spectrum. The equivalent peaks in the original FFT are matched in frequency with the largest autocorrelated FFT peaks. These resulting peaks comprise the Periodic Information Plot (as described in U.S. Pat. No. 11,002,641).

PIP Located Peaks(j): A list of j number of peaks located in the Periodic Information Plot (PIP), wherein each located peak has a located frequency and a located amplitude PIP Energy: The total energy associated with peaks in the Periodic Information Plot Nonsynchronous PIP: The PIP with the synchronous periodic peaks removed. The synchronous peaks are continuously removed as they are found

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIG. 12 depicts a process for separating FOI peaks from other peaks according to a preferred embodiment.

DETAILED DESCRIPTION

Figure 1A:
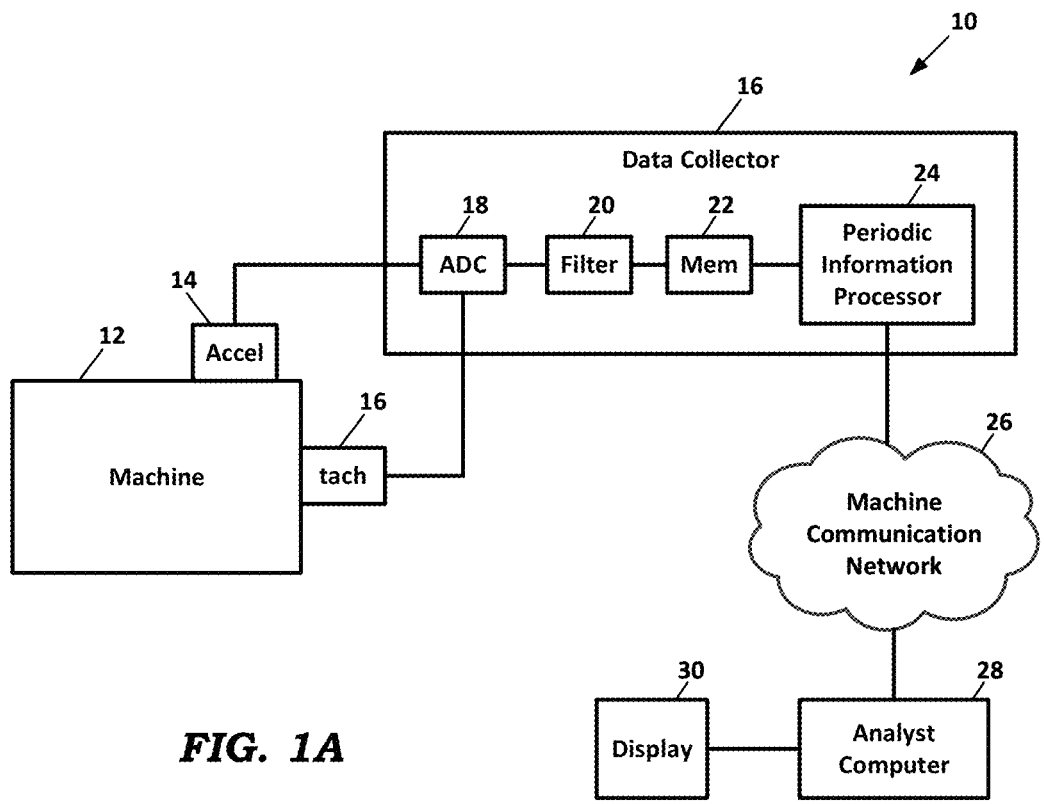
FIGS. 1A and 1B depict functional block diagrams of a system for deriving and analyzing periodic information in a signal according to preferred embodiments of the invention.
Figure 1B:
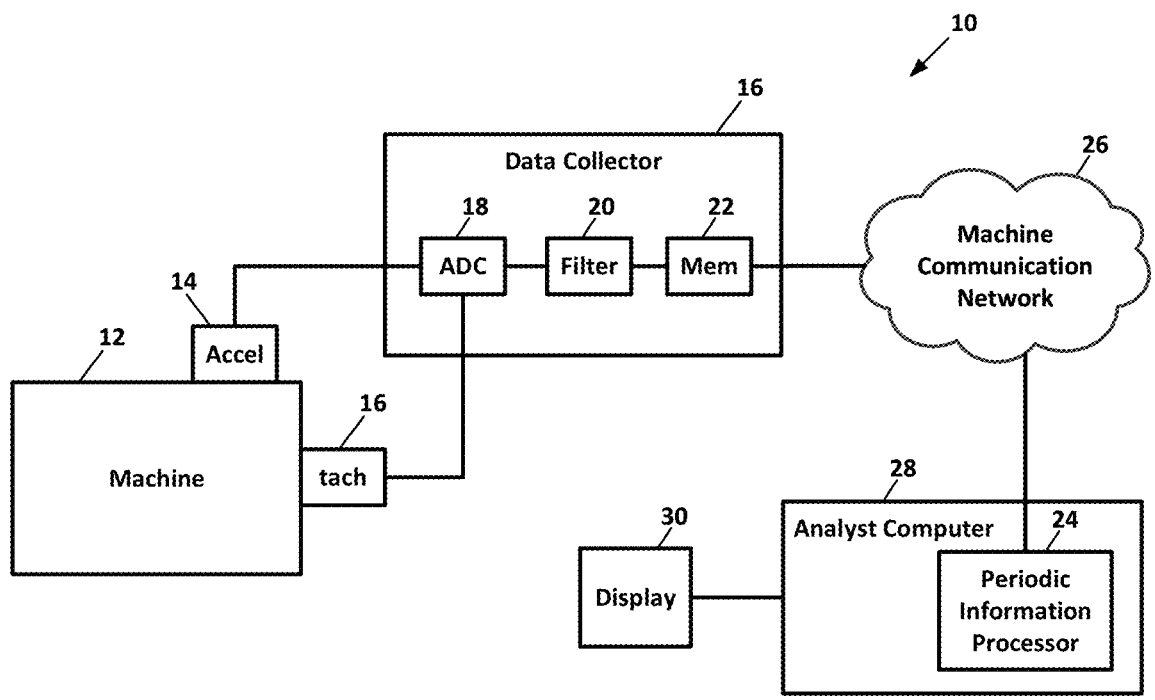
Figure 2:
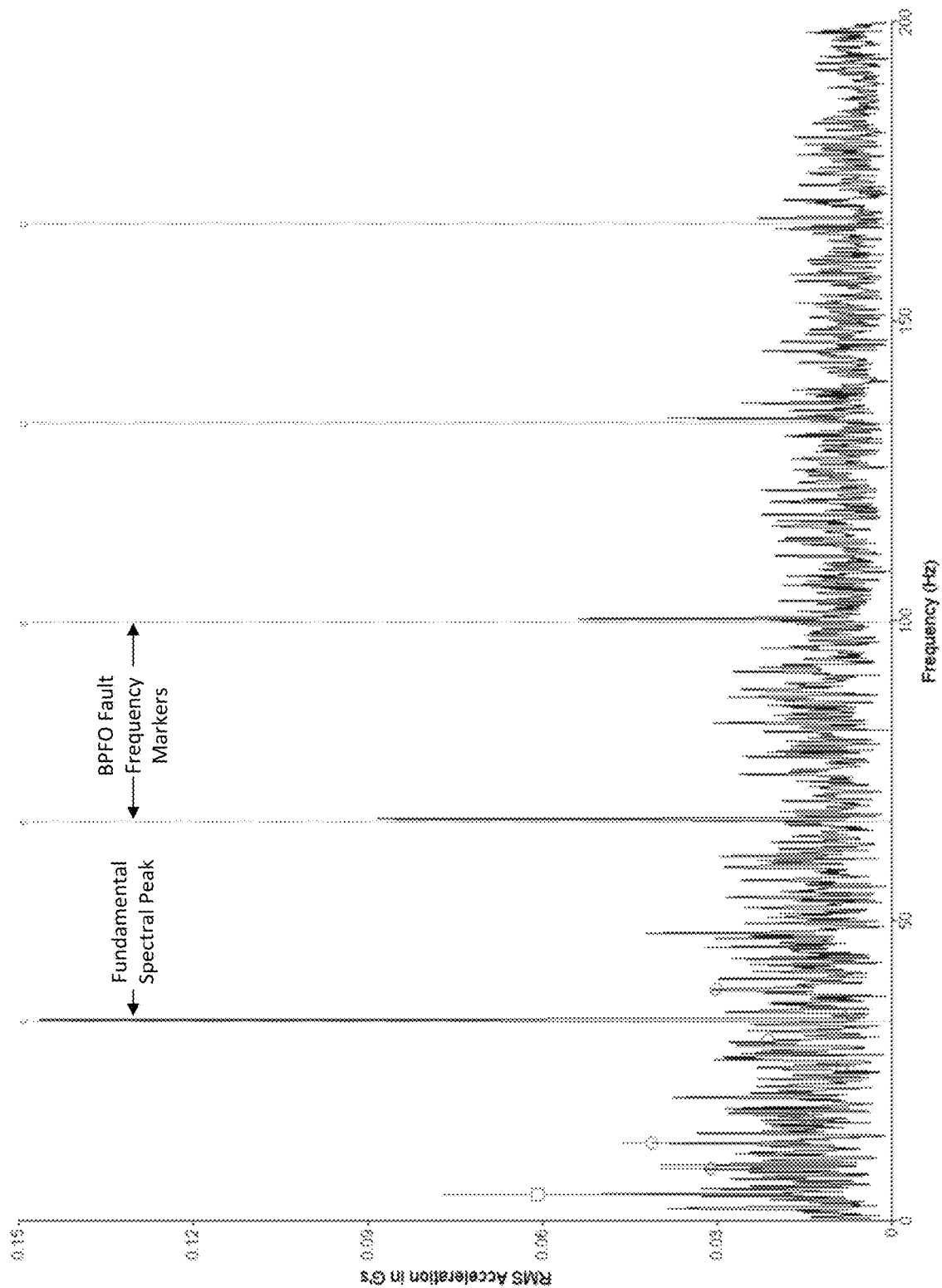
FIG. 2 depicts a spectral display that includes markers associated with a set of bearing outer race (BPFO) fault frequencies overlaid on a frequency spectrum that indicates a BPFO fault.
Figure 3:
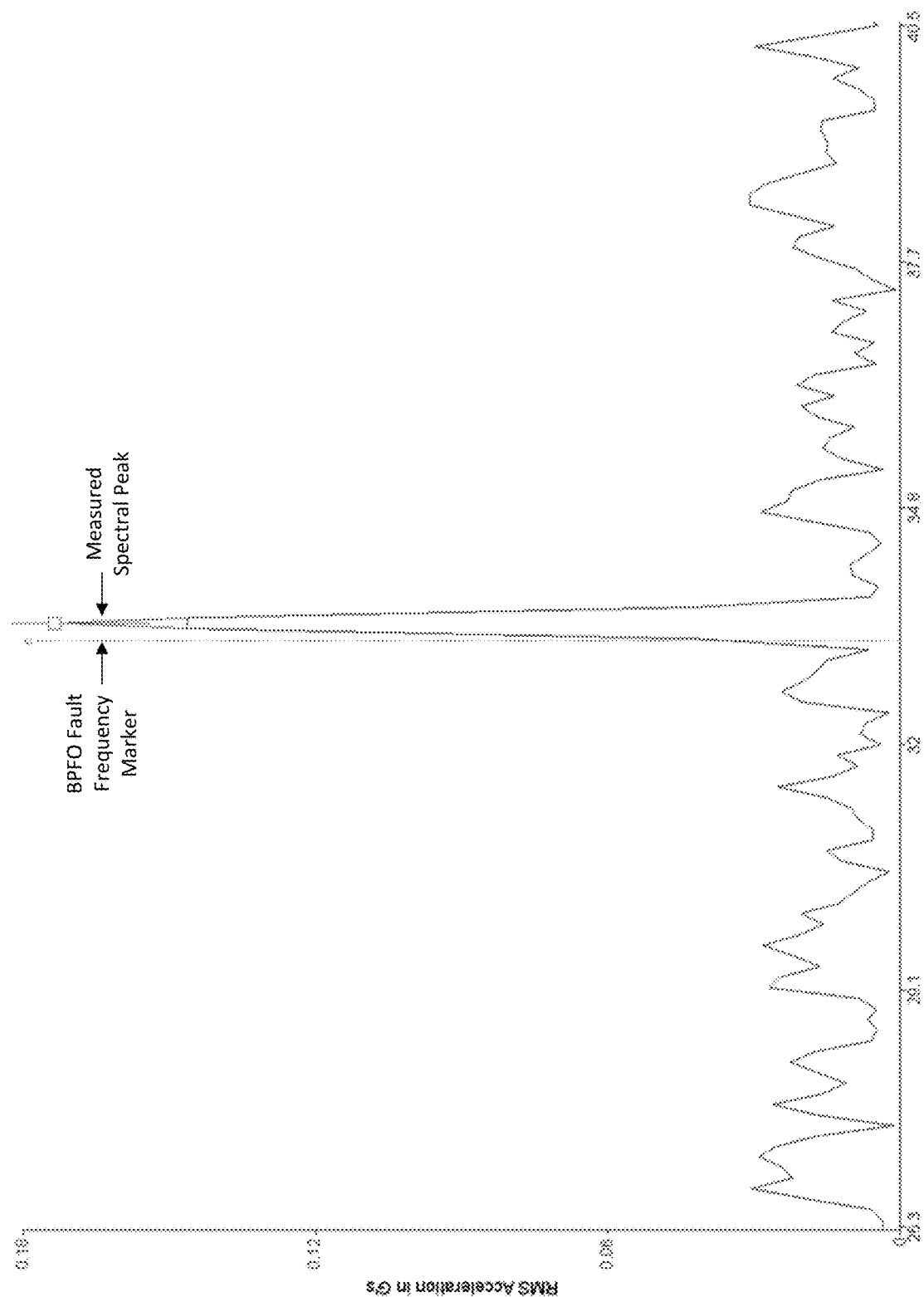
FIG. 3 depicts a zoomed-in view of the display of FIG. 2 showing a fundamental fault frequency location marker alongside the largest peak in the spectrum.
Figure 4:
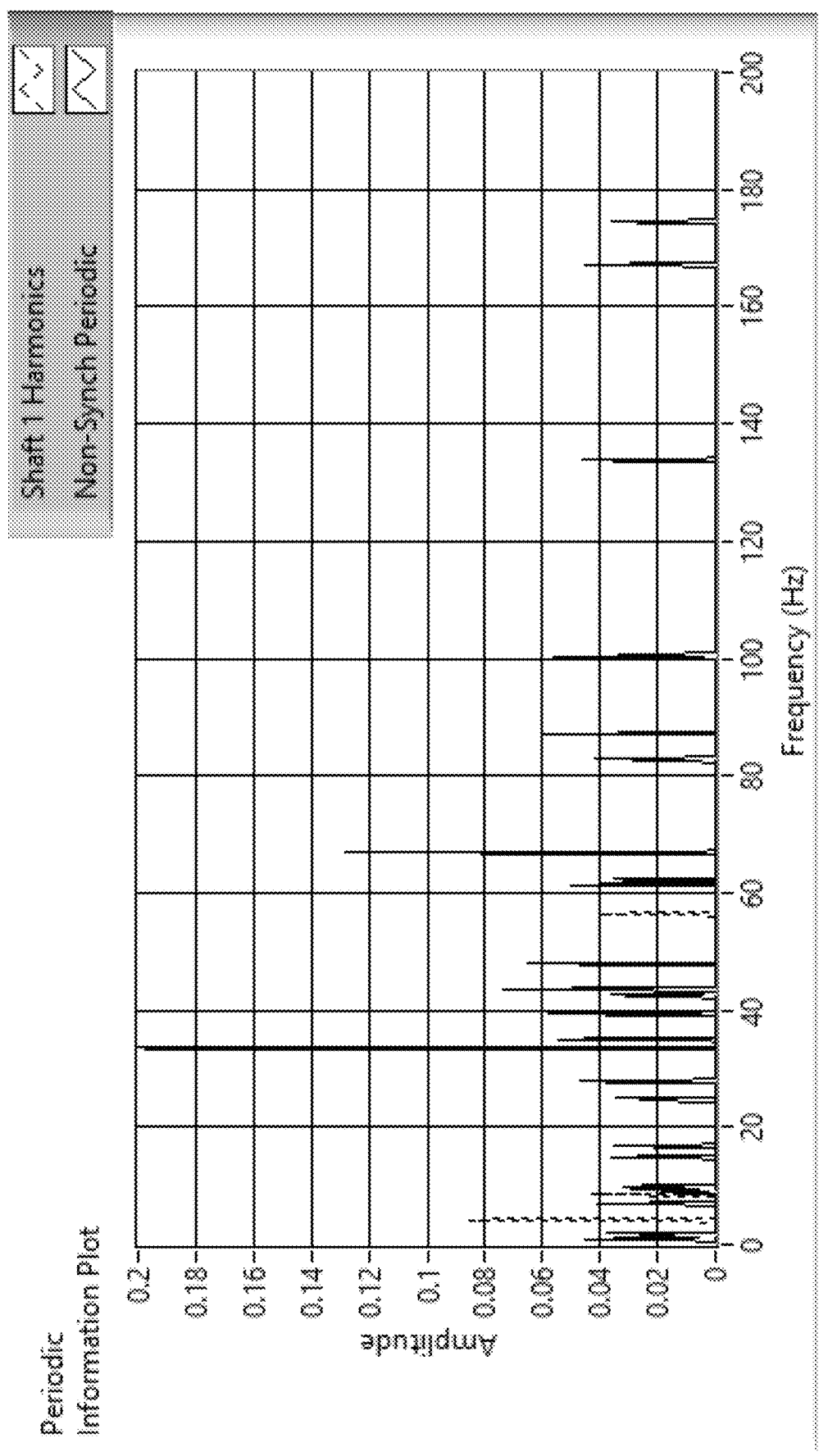
FIG. 4 depicts a Periodic Information Plot (PIP) of a non-gearbox asset (derived from peaks in FIG. 2) with unknown bearing characteristics, which shows the synchronous periodic peaks related to the running speed plotted in dashed lines and the non-synchronous periodic peaks plotted in solid lines.
Figure 5:
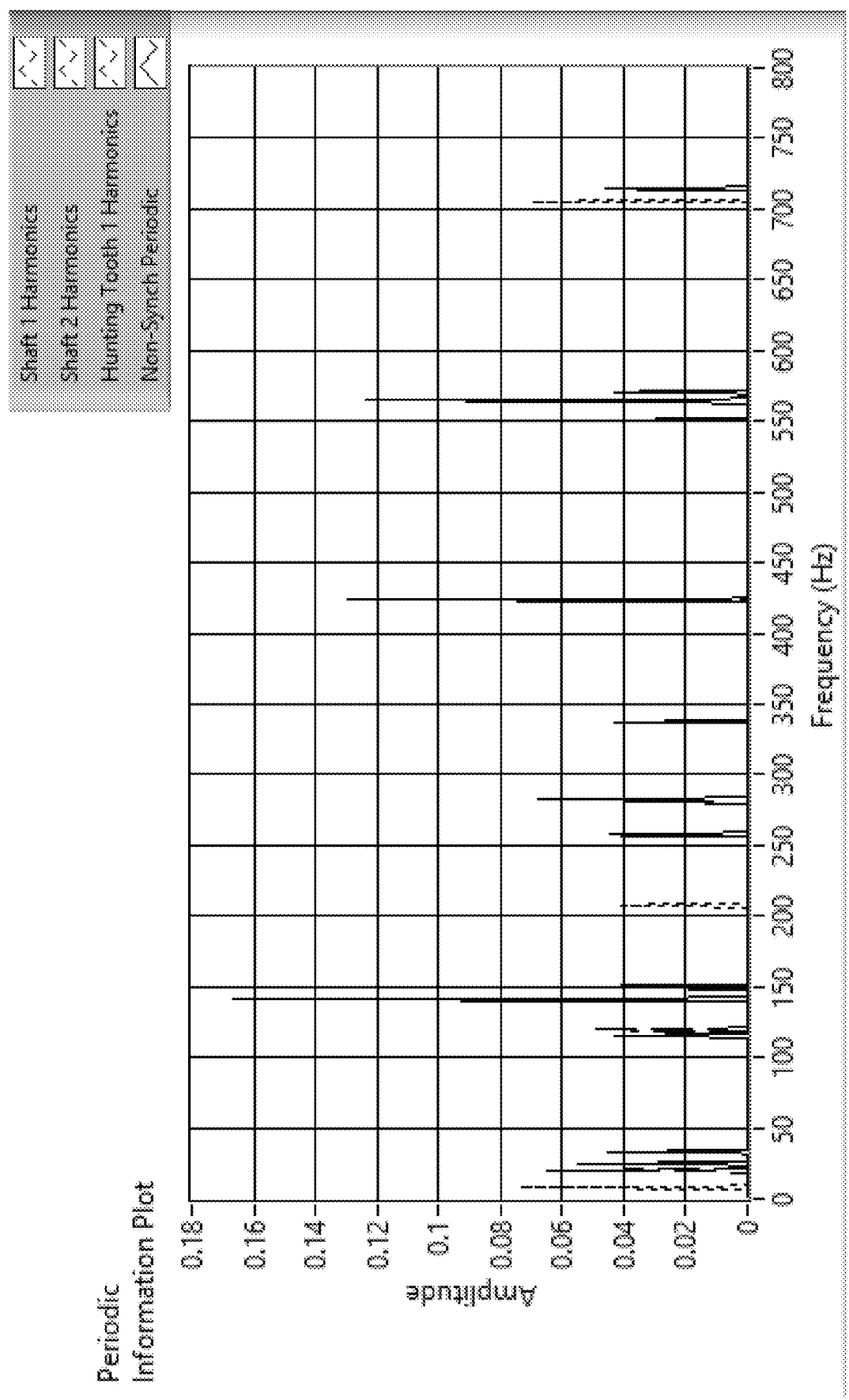
FIG. 5 depicts a PIP of a gearbox, wherein the synchronous periodic peaks include all shaft speeds and associated hunting tooth frequencies, wherein the non-synchronous periodic peaks are plotted in solid lines.
Figure 6:
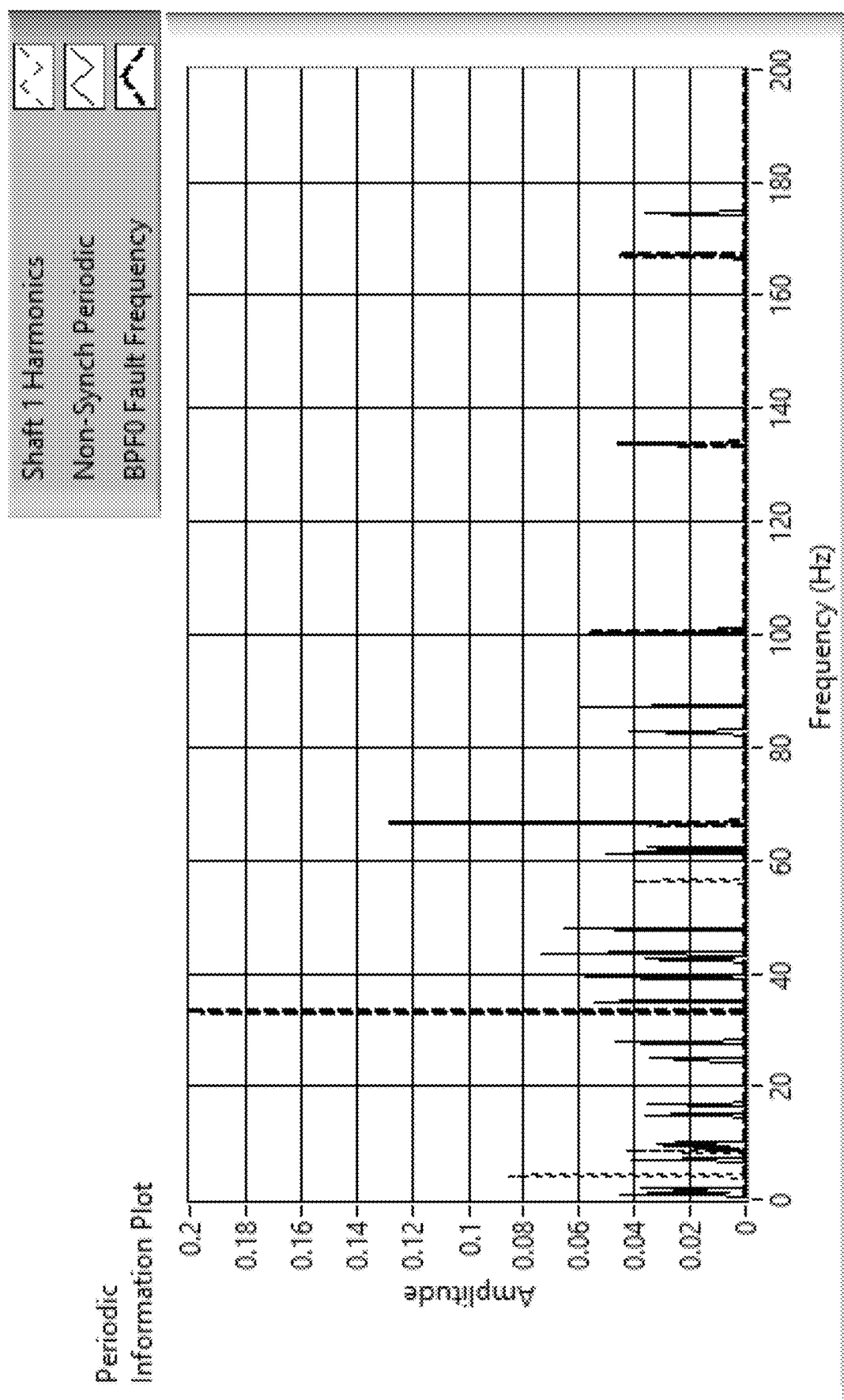
FIG. 6 depicts a PIP of the non-gearbox asset shown in FIG. 4 which indicates an outer race defect (BPFO fault frequency) plotted in bold dashed lines.
Figure 7:
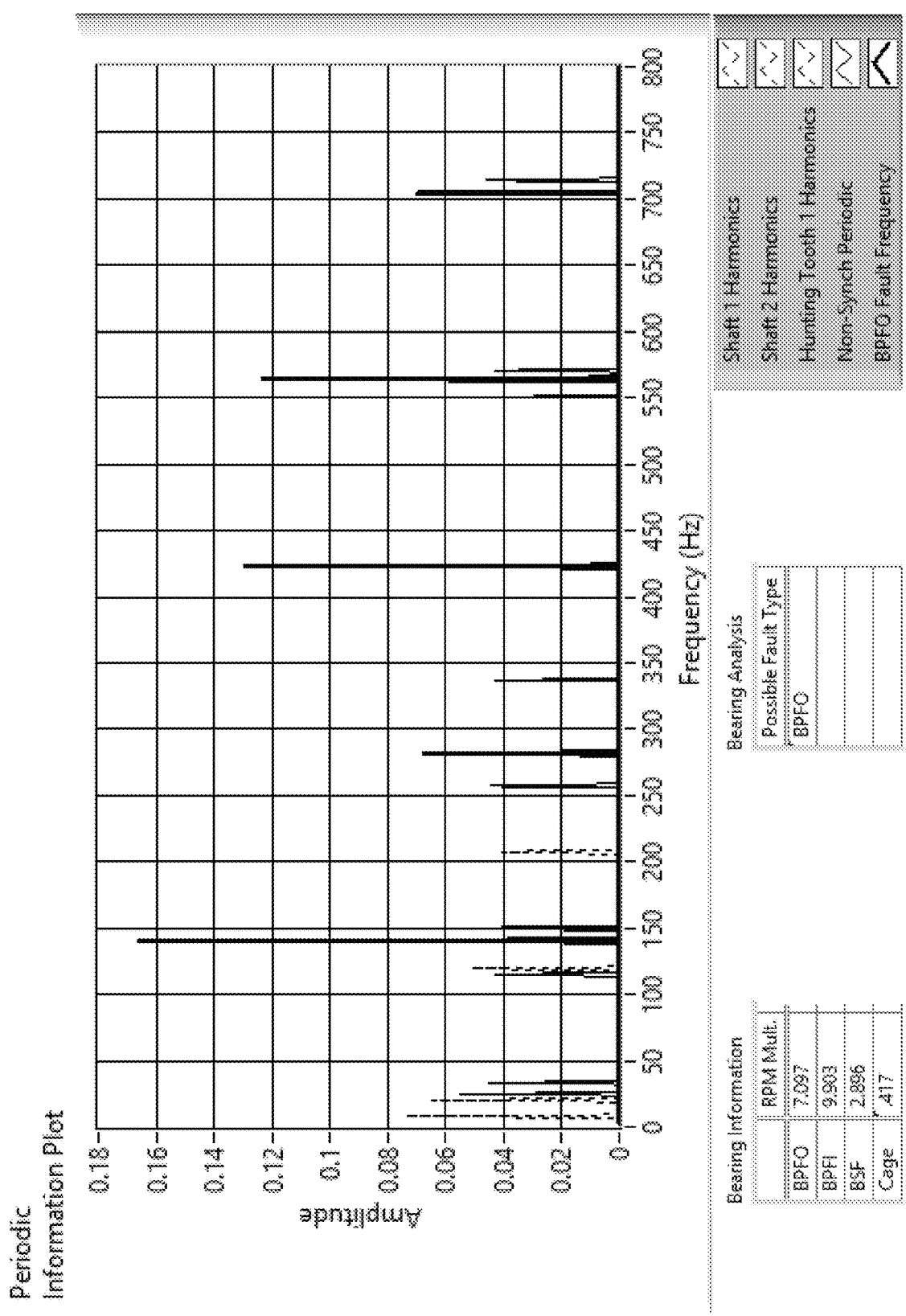
FIG. 7 depicts a PIP of the gearbox shown in FIG. 5 which indicates an outer race defect (BPFO fault frequency) plotted in bold solid lines and wherein analysis confirms a BPFO fault.
Figure 8:
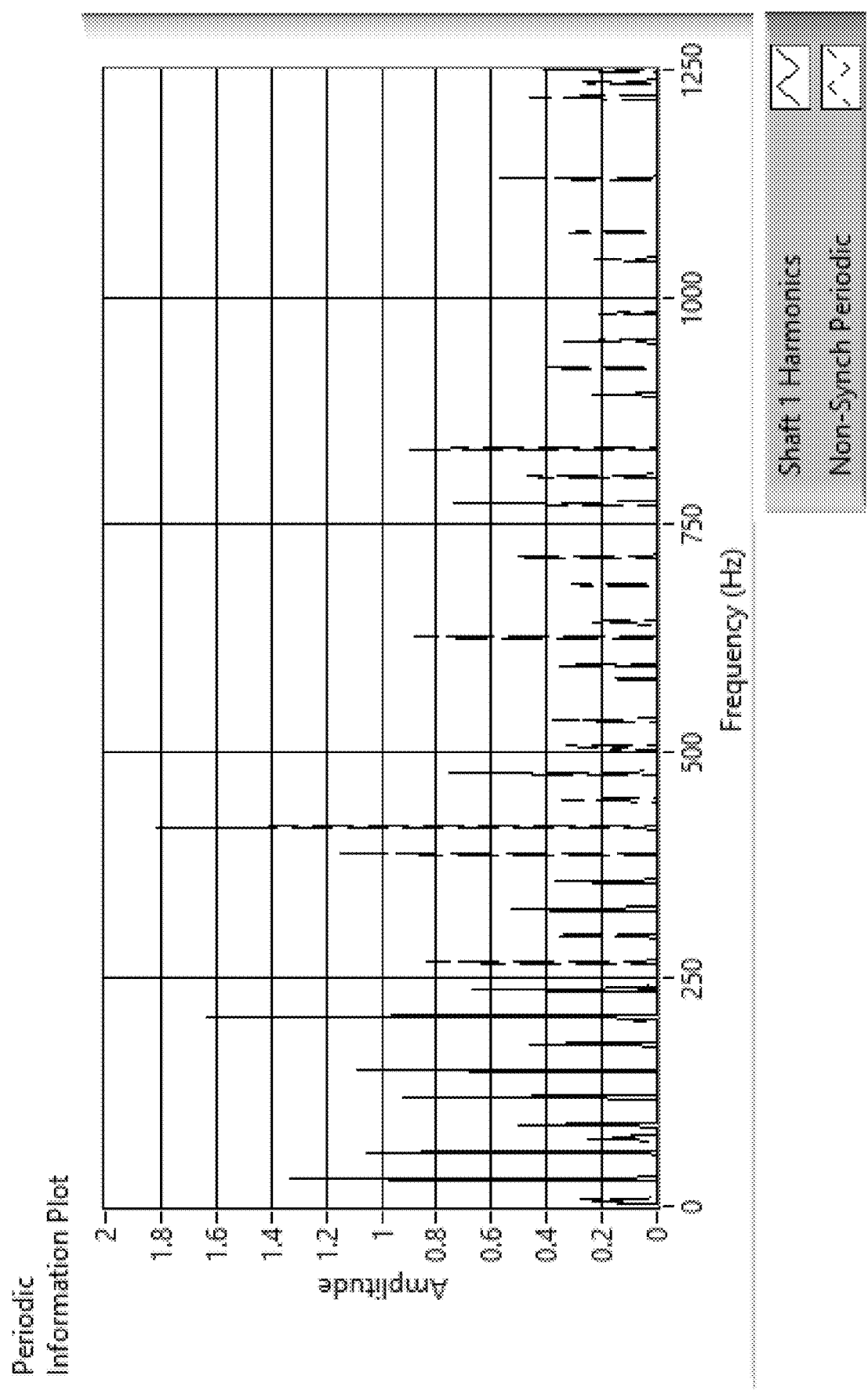
FIG. 8 depicts a PIP with non-synchronous periodic peaks plotted in dashed lines and with many harmonics of the turning speed plotted in solid lines.
Figure 9:
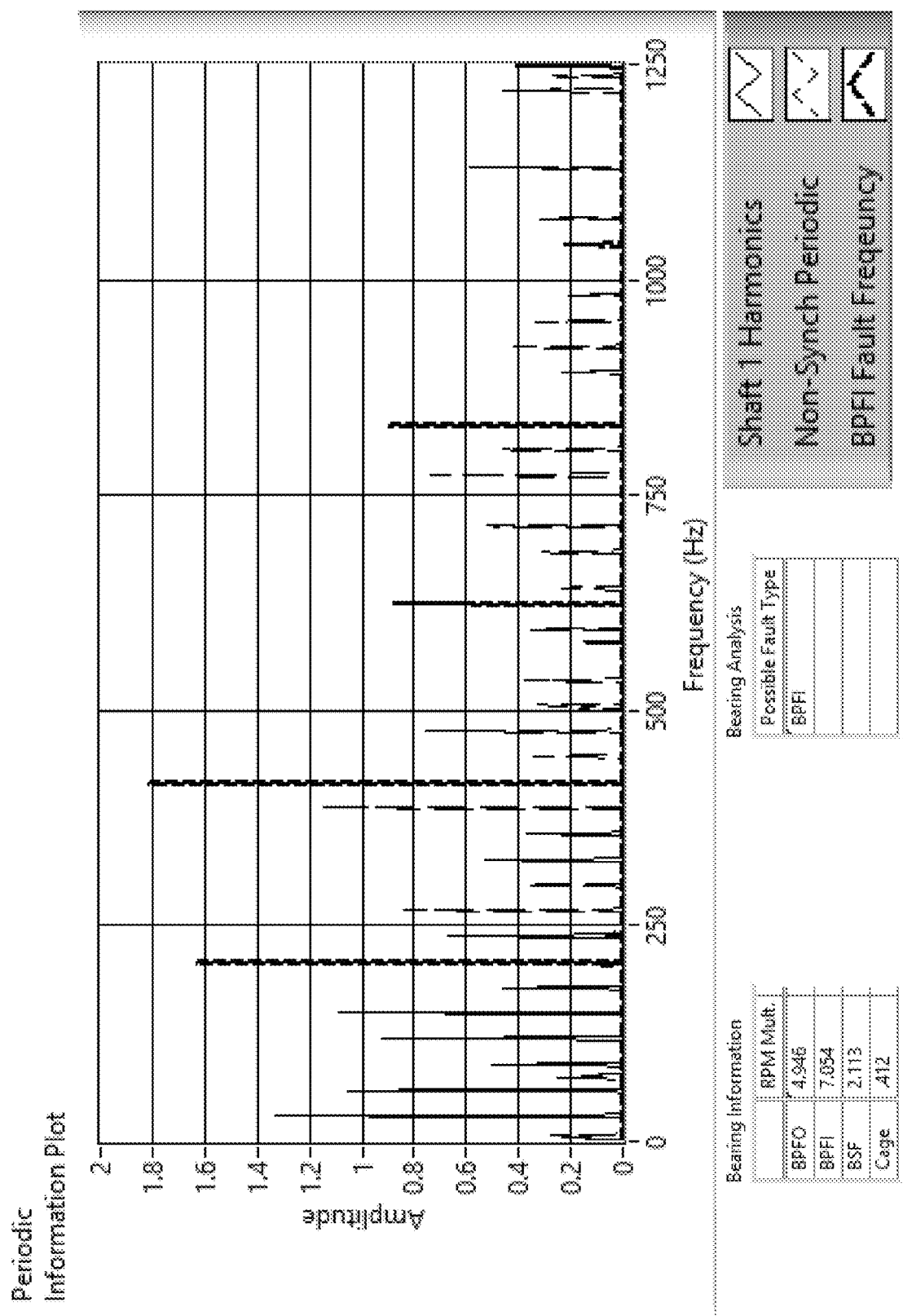
FIG. 9 depicts a PIP of a bearing with many harmonics of the turning speed (plotted in solid lines), in which analysis indicates an inner race bearing fault (BPFI), with the associated peaks plotted in bold dashed lines.

FIGS. 1A and 1B depict exemplary systems 10 for deriving and analyzing periodic information in a vibration signal. In the embodiment of FIG. 1A, a sensor 14, such as an accelerometer, is attached to a machine 12 to monitor its vibration. Although an accelerometer is depicted in the exemplary embodiment of FIG. 1A, it should be appreciated that other types of sensors could be used, such as a velocity sensor, a displacement probe, an ultrasonic sensor, or a pressure sensor. The sensor 14 generates a vibration signal (or other type of signal for a sensor other than an accelerometer) that contains periodic information. For repeatable and best results, it is preferable to place each sensor 14 such that there is a solid path of transition from the signal source (e.g., a bearing) to the mounting location of the sensor. The mounting of the sensor 14 should also be performed to ensure that the signal is sensed with as minimal distortion as possible. Preferred embodiments include one or more tachometers 16 for measuring the rotational speed of one or more rotating components of the machine 12. The vibration and tachometer signals are provided to a data collector 16 preferably comprising an analog-to-digital converter (ADC) 18 for sampling the vibration and tachometer signals, an optional low-pass anti-aliasing filter 20 (or other combination of low-pass and high-pass filters), and buffer memory 22. For example, the data collector 16 may be a digital data recorder, a handheld vibration data collector, or a permanently or temporarily mounted monitoring device. The vibration signal data is communicated to a periodic information processor 114 that performs the information processing tasks described herein. In the embodiment of FIG. 1A, the periodic information processor 24 is a component of the data collector 16. In this embodiment, the periodic information processor 24 communicates processed data via a machine data network 26, which may be a HART™ or WirelessHART™ network, an Ethernet network, or the Internet. An analyst computer 28 receives the processed data via the network 26 for display on a display device 30.

In an alternative embodiment depicted in FIG. 1B, the periodic information processor 24 is a component of the analyst computer 28. This embodiment may be preferable for situations in which data transmission and storage are not a major concern, so that the entire data set can be transferred via the network 26 to the analyst computer 28 or other remote processing device for post-processing using the same algorithms and techniques.

With regard to sensor placement for bearing and gear diagnosis, the sensor 14 is typically mounted orthogonal to the shaft. It is preferably mounted on a rigid and massive piece of metal that is near the source of the signal (i.e., bearing or gear). The large mass of metal on which the sensor is mounted helps prevent resonances entering the signal due to the surface of the machine as opposed to what is happening internal to the machine. The sensor 104 should be mounted so as to minimize loss of signal integrity during transmission. This requires a rigid connection—typically by stud mounting the sensor 104. In some circumstances, such as where the mounting surface of the machine is rough or covered with many layers of paint, the surface will need to be sanded.

Figure 10:
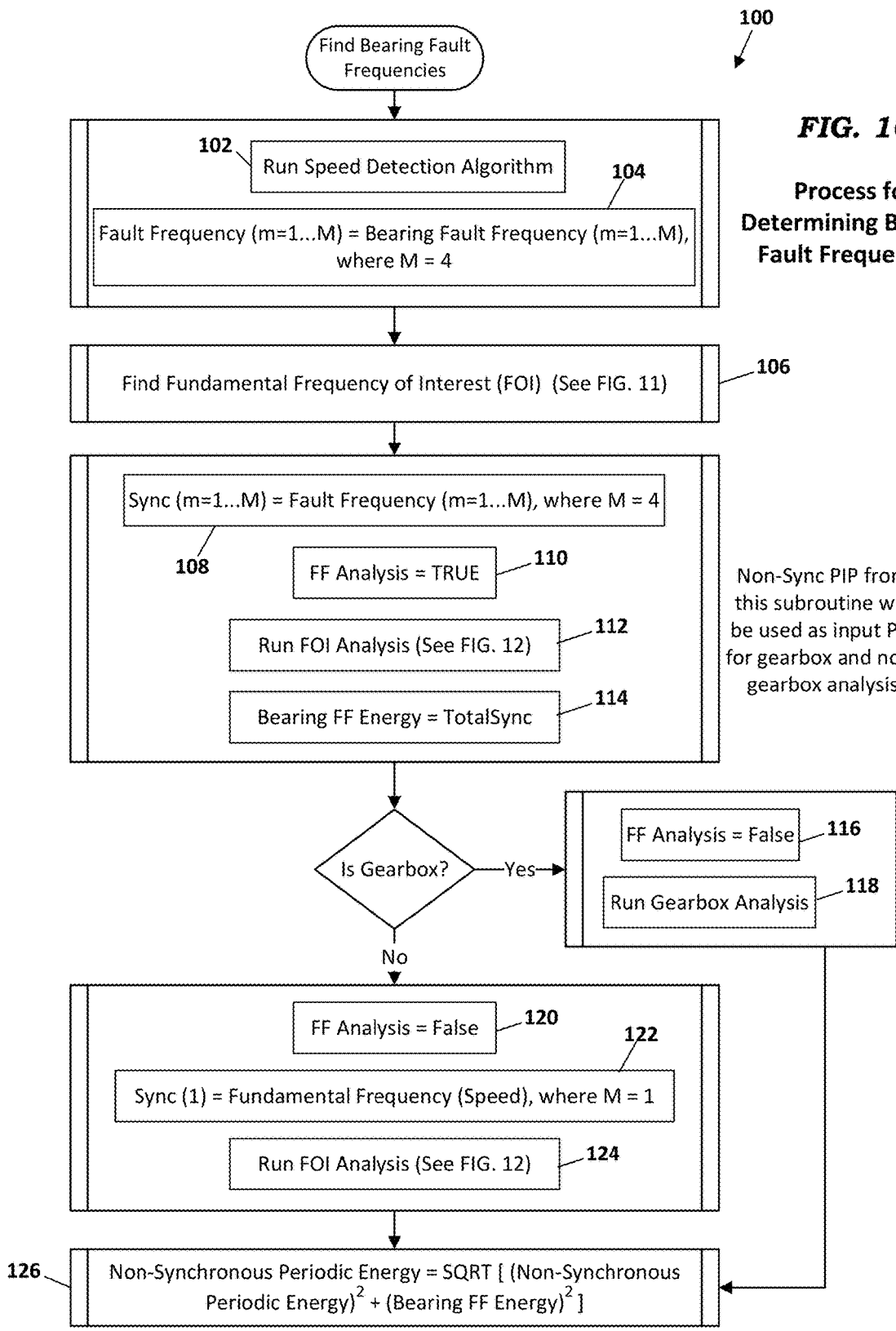
FIG. 10 depicts a process for determining bearing fault frequencies according to a preferred embodiment.

FIG. 10 depicts a preferred embodiment of a process 100 for determining bearing fault frequencies based on vibration spectral data, such as data collected using one of the exemplary systems 10 depicted in FIGS. 1A and 1B. A speed detection algorithm is executed to determine the running speed of the machine (step 102). An exemplary speed detection algorithm is described in U.S. Pat. No. 11,009,520, the entire contents of which are incorporated herein by reference. Alternatively, the running speed of the machine is measured directly using the tachometer 16. Initially, values in the list Fault Frequency(1 . . . M) are set equal to values of Bearing Fault Frequency(1 . . . M), where M is 4 (step 104). The values Bearing Fault Frequency(1 . . . M) are typically calculated based on the bearing dimensions and components, and may be provided by the bearing manufacturer. In preferred embodiments, the values are provided in a bearing information file that the analysis software accesses.

In step 106, the fundamental frequency of interest (FOI) is found using the process depicted in FIG. 11, as described in more detail hereinafter.

Initial values for Sync(1 . . . M) are set equal to the values of Fault Frequency (1 . . . M), where M is 4 (step 108), and FF Analysis is set to TRUE (step 110). In step 112, FOI analysis is performed using the process depicted in FIG. 12, as described in more detail hereinafter. The value Bearing FF Energy is then set equal to the TotalSync value determined by the process of FIG. 12.

If the vibration data under analysis was collected for a gearbox, the value FF Analysis is set to FALSE (step 116), and a gearbox analysis is performed using the process described in U.S. Pat. No. 10,416,126 and 11,002,641(which describes the use of gear mesh frequency to determine speed), the entire contents of which are incorporated herein by reference (step 118). For gearboxes, this process involves finding all shaft speeds and the associated hunting tooth frequencies, and assigning each speed and hunting tooth frequency as an FOI, as is done when finding fault frequencies. The process then proceeds to step 126, where the Nonsynchronous Periodic Energy is calculated as Nonsynchronous Periodic Energy =
$$\sqrt{(\text{Nonsynchronous Periodic Energy})^2 + (\text{Bearing } FF \text{ Energy})^2}$$

This total non-synchronous periodic energy is incorporated in calculating the severity of the mechanical fault (bearing fault) as described in U.S. Pat. No. 10,416,126.

If the vibration data under analysis was not collected for a gearbox, the value FF Analysis is set to FALSE (step 120), the value of Sync(1) is set to the fundamental running speed (step 122), and the FOI analysis is performed using the process depicted in FIG. 12, as described in more detail hereinafter (step 124). The process then proceeds to step 126 where the Nonsynchronous Periodic Energy is calculated.

Figure 11:
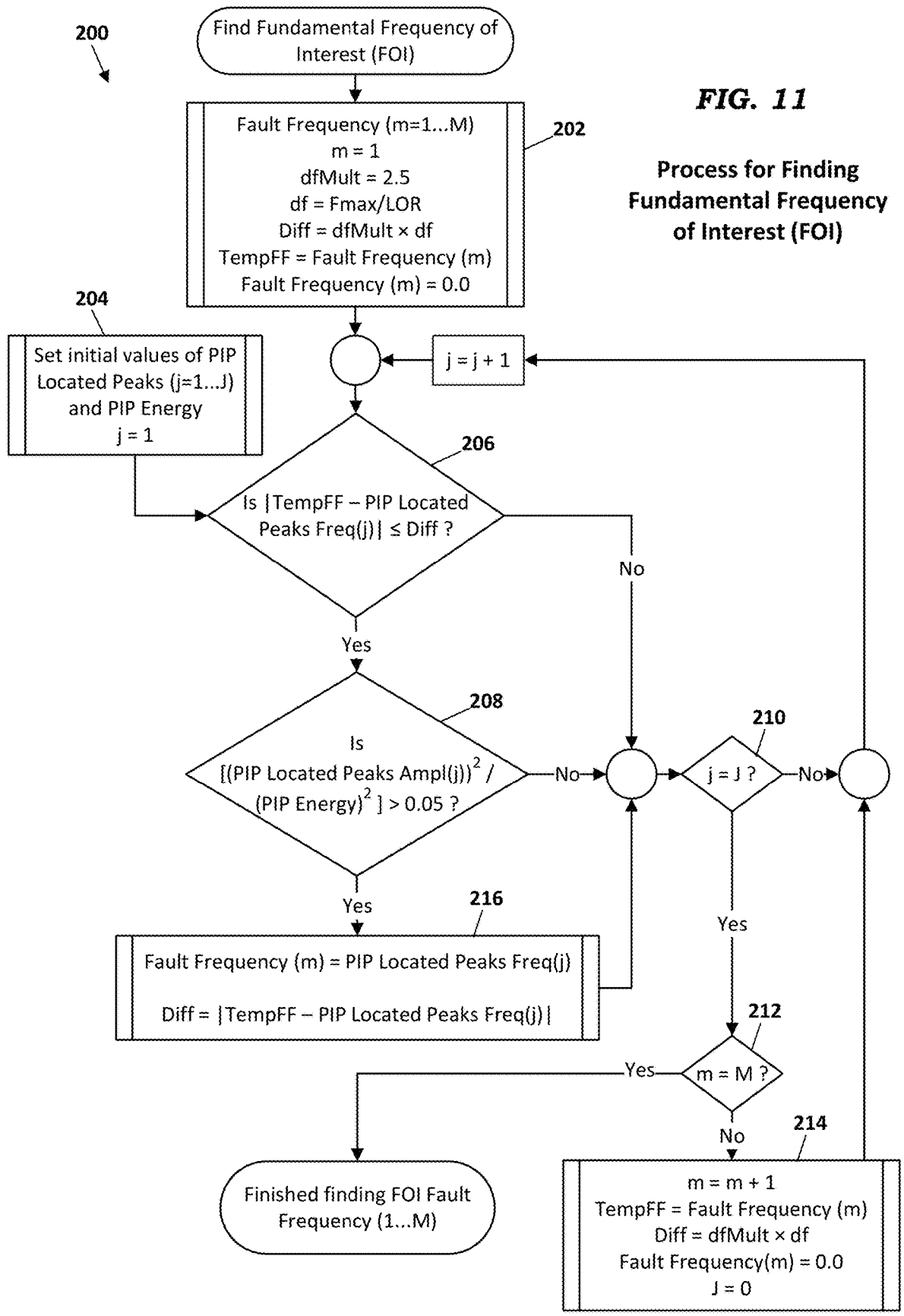
FIG. 11 depicts a process for finding the fundamental frequency of interest (FOI) according to a preferred embodiment.

FIG. 11 depicts a preferred embodiment of a process 200 for finding the fundamental frequency of interest (FOI) referenced at step 106 in FIG. 10. The process begins with the list Fault Frequency(1 . . . M) as set in step 104 in FIG. 10, and with the following initial values (step 202):

m=1 dfMult=2.5 df=Fmax/LOR

Diff=dfMult×df

TempFF=Fault Frequency (m)

Fault Frequency (m)=0.0

In step 204, initial values for PIP Located Peaks(j=1 . . . J) and PIP Energy are provided, and the integer j is set to 1. The initial values of PIP Located Peaks(j=1 . . . J) and PIP Energy are determined according to the processes described in U.S. Pat. Nos. 10,416,126 and 11,002,641.

If |TempFF—PIP Located Peaks Freq(j)| is less than or equal to Diff (step 206), the process proceeds to step 208. If TempFF—PIP Located Peaks Freq(j) is not less than or equal to Diff (step 206), and the integer j is not equal to J (step 210), then j is incremented by one and the process loops back to step 206. If j is equal to J at step 210, and the integer m is equal to M (step 212), then all fault frequencies of interest have been searched and the process is complete. If m is not equal to M at step 212, then m is incremented by one, TempFF is set equal to Fault Frequency(m), Diff is set equal to dfMult×df, Fault Frequency(m) is set equal to zero, and J is set equal to zero (step 214). The integer j is then incremented by one and the process loops back to step 206.

At step 208, if [(PIP Located Peaks Ampl(j))$^2$/(PIP Energy)$^2$] is not greater than 0.05, then the process proceeds at step 210 as described above. If [(PIP Located Peaks Ampl(j))$^2$/(PIP Energy)$^2$] is greater than 0.05 at step 208, then the value of Fault Frequency (m) is set to the value of PIP Located Peaks Freq(j), and Diff is set equal to TempFF—PIP Located Peaks Freq(j) (step 216).

FIG. 12 depicts a preferred embodiment of a process 300 for separating the frequency of interest (FOI) peaks from other peaks, as referenced at steps 112 and 124 in FIG. 10. The process begins with setting the initial value of TotalSync to zero, setting the integer m to one, and setting the Frequency of Interest to equal Sync(m) (step 302). If m equals one (step 304—first time through the loop), a Periodic Information Plot (PIP) is calculated, a peak list is generated, and a total PIP Energy is determined according to the processes described in U.S. Pat. Nos. 10,416,126 and 11,002,641, the entire contents of which are incorporated herein by reference (step 306). If m is not equal to one at step 304, then a nonsynchronous PIP is generated (step 308). At step 310, synchronous and nonsynchronous periodic peaks are calculated based on the Frequency of Interest, and Synchronous Periodic Energy and Nonsynchronous Periodic Energy are calculated.

If FF Analysis is not TRUE (step 312), then processing proceeds to step 316. If FF Analysis is TRUE (step 312), then the value Ratio is calculated according to:

Ratio=(Synchronous Periodic Energy)$^2$/(PIP Energy)$^2$, and if Ratio is less than 0.05, Synchronous Periodic Energy is set to zero (step 314) and processing continues at step 316.

If m is not equal to M at step 316, m is incremented by one (step 318) and Sync Energy(m−1) is set equal to Synchronous Periodic Energy (step 320). At step 322, TotalSync is calculated according to:

$$\text{TotalSync} = \sqrt{(\text{TotalSync})^2 + (\text{Synchronous Periodic Energy})^2}.$$

At step 324, if the process is not looking for a fault frequency (IF .NOT. FF Analysis) or Sync Energy(m−1) is greater than zero, then a nonsynchronous PIP is generated by removing synchronous peaks associated with Sync(m−1), and Frequency of Interest is set to Sync(m). The process then loops back to step 304.

If m is equal to M at step 316, Sync Energy(m) is set equal to Synchronous Periodic Energy, and TotalSync is calculated according to:

$$\text{TotalSync} = \sqrt{(\text{TotalSync})^2 + (\text{Synchronous Periodic Energy})^2}.$$

If the process is not looking for a fault frequency (IF .NOT. FF Analysis) or Sync Energy(m) is greater than zero, then a nonsynchronous PIP is generated by removing synchronous peaks associated with Sync(m) (step 326). The PIP is then displayed (such as on the display device 30) in which each Sync(j) and associated harmonics and nonsynchronous periodic peaks are plotted in different colors or line styles depending on their harmonic groups (step 328).

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An apparatus for acquiring and analyzing periodic information in vibration associated with a machine, the apparatus comprising:
   a vibration sensor securely attached to the machine in a location providing a solid transmission path from a source of vibration within the machine to the vibration sensor, the vibration sensor for generating a vibration signal;
   a data collector in communication with the vibration sensor, the data collector configured to receive and condition the vibration signal, the data collector comprising:
      an analog-to-digital converter for converting the vibration signal to digital vibration data; and
      memory for buffering the digital vibration data; and
   a processor operable to receive the digital vibration data, the processor configured to execute operational instructions for processing the digital vibration data, the operational instructions comprising instructions which, when executed:
      determine a rotational speed of a rotational component of the machine;
      generate a vibration waveform based on the digital vibration data;
      generate a spectral periodic information plot based on the digital vibration data;
      locate amplitude peaks in the periodic information plot at frequencies associated with fundamental frequencies of interest associated with a fundamental frequency of a fault frequency family of peaks;
      remove amplitude peaks at fundamental fault frequencies and at related harmonic frequencies from the periodic information plot;
      retain non-synchronous energy values associated with the removed amplitude peaks;
      classify remaining amplitude peaks in the periodic information plot as synchronous periodic peaks and non-synchronous periodic peaks;
      calculate a non-synchronous periodic energy value associated with the non-synchronous periodic peaks;
      graphically plot the fault frequency family of peaks and the remaining amplitude peaks in the periodic information plot in different colors or different line styles on a display device to identify different groups of frequencies of interest, and display the non-synchronous periodic energy value with the periodic information plot on the display device.

2. The apparatus of claim 1 wherein the fault frequency family of peaks are associated with a bearing fault in the machine, and the processor calculates bearing fault severity based at least in part on the non-synchronous periodic energy value.

3. The apparatus of claim 1 wherein the processor locates the amplitude peaks in the periodic information plot at frequencies associated with fundamental frequencies of interest even though the frequencies of the amplitude peaks do not precisely match the fundamental frequencies of interest.

4. The apparatus of claim 3 wherein locating the amplitude peaks in the periodic information plot at frequencies associated with the fundamental frequencies of interest includes, for each amplitude peak:
   determining a frequency difference between a frequency of the amplitude peak and a frequency associated with a corresponding fundamental frequency of interest;
   if the frequency difference is less than a predetermined difference value, designating the amplitude peak as a candidate for a match to the corresponding fundamental frequency of interest;
   calculating a percent energy value for the amplitude peak;
   if the percent energy value of the amplitude peak is greater than a predetermined percentage of a total energy of the periodic information plot, designating the amplitude peak as a candidate for a match to the corresponding fundamental frequency of interest; and
   choosing a candidate amplitude peak having a frequency closest to the fundamental frequency of interest as the fundamental fault frequency peak.

5. The apparatus of claim 1 wherein the processor:
   analyzes the amplitude peaks in the periodic information plot associated with the fundamental frequencies of interest to determine types of machine faults associated with the amplitude peaks; and
   displays information indicating the types of machine faults with the periodic information plot on the display device.

6. The apparatus of claim 5 wherein the processor displays the information indicating the types of machine faults selected from the group consisting of Ball Pass Frequency of the Inner race (BPFI), Ball Pass Frequency of the Outer race (BPFO), Ball Spin Frequency (BSF), and Fundamental Train Frequency (FTF).

7. The apparatus of claim 1 further comprising:
   a data communication network to which the processor is connected and through which the periodic information plot is communicated; and
   an analyst computer connected to the data communication network, the analyst computer for receiving and displaying the periodic information plot for viewing by an analyst.

8. The apparatus of claim 1 wherein the data collector comprises a digital data recorder or a vibration data collector.

9. The apparatus of claim 1 wherein the processor is a component of the data collector.

10. The apparatus of claim 1 wherein the processor is a component of an analyst computer that is in communication with the data collector via a communication network.

11. A computer-implemented method for acquiring and analyzing periodic information in vibration associated with a machine, the method comprising:
   (a) generating a vibration signal using a vibration sensor securely attached to the machine;
   (b) converting the vibration signal to digital vibration data;
   (c) determining a rotational speed of a rotational component of the machine;
   (d) generating a vibration waveform based on the digital vibration data;

(e) generating a spectral periodic information plot based on the digital vibration data;

(f) locating amplitude peaks in the periodic information plot at frequencies associated with fundamental frequencies of interest associated with a fundamental frequency of a fault frequency family of peaks;

(g) removing amplitude peaks at fundamental fault frequencies and at related harmonic frequencies from the periodic information plot;

(h) classifying remaining amplitude peaks in the periodic information plot as synchronous periodic peaks and non-synchronous periodic peaks;

(i) graphically plotting the fault frequency family of peaks and the remaining amplitude peaks in the periodic information plot in different colors or different line styles on a display device to identify different groups of frequencies of interest;

(j) retaining non-synchronous energy values associated with the removed amplitude peaks;

(k) calculating a non-synchronous periodic energy value associated with the non-synchronous periodic peaks; and (l) displaying the non-synchronous periodic energy value with the periodic information plot on the display device.

12. The method of claim 11 wherein the fault frequency family of peaks are associated with a bearing fault in the machine, and the method further comprises calculating bearing fault severity based at least in part on the non-synchronous periodic energy value.

13. The method of claim 11 wherein step (1) further comprises locating the amplitude peaks in the periodic information plot at frequencies associated with fundamental frequencies of interest even though the amplitude peaks in the periodic information plot do not precisely match the fundamental frequencies of interest.

14. The method of claim 13 wherein step (f) includes, for each amplitude peak:
determining a frequency difference between a frequency of the amplitude peak and a frequency associated with a corresponding fundamental frequency of interest;
if the frequency difference is less than a predetermined difference value, designating the amplitude peak as a candidate for a match to the corresponding fundamental frequency of interest;
calculating a percent energy value for the amplitude peak;
if the percent energy value of the amplitude peak is greater than a predetermined percentage of a total energy of the periodic information plot, designating the amplitude peak as a candidate for a match to the corresponding fundamental frequency of interest; and
choosing a candidate amplitude peak having a frequency closest to the fundamental frequency of interest as the fundamental fault frequency peak.

15. The method of claim 11 further comprising:
(j) analyzing the amplitude peaks in the periodic information plot associated with the fundamental frequencies of interest to determine types of machine faults associated with the amplitude peaks; and
(k) displaying information indicating the types of machine faults with the periodic information plot on the display device.

16. The method of claim 15 wherein step (k) further comprises displaying the information indicating the types of machine faults selected from the group consisting of Ball Pass Frequency of the Inner race (BPFI), Ball Pass Frequency of the Outer race (BPFO), Ball Spin Frequency (BSF), and Fundamental Train Frequency (FTF).

17. An apparatus for acquiring and analyzing periodic information in vibration associated with a machine, the apparatus comprising:
a vibration sensor securely attached to the machine in a location providing a solid transmission path from a source of vibration within the machine to the vibration sensor, the vibration sensor for generating a vibration signal;
a data collector in communication with the vibration sensor, the data collector configured to receive and condition the vibration signal, the data collector comprising:
an analog-to-digital converter for converting the vibration signal to digital vibration data; and
memory for buffering the digital vibration data; and
a processor operable to receive the digital vibration data, the processor configured to execute operational instructions for processing the digital vibration data, the operational instructions comprising instructions which, when executed:
determine a rotational speed of a rotational component of the machine;
generate a vibration waveform based on the digital vibration data;
generate a spectral periodic information plot based on the digital vibration data;
locate amplitude peaks in the periodic information plot at frequencies associated with fundamental frequencies of interest associated with a fundamental frequency of a fault frequency family of peaks, wherein, for each amplitude peak the locating includes:
determining a frequency difference between a frequency of the amplitude peak and a frequency associated with a corresponding fundamental frequency of interest;
if the frequency difference is less than a predetermined difference value, designating the amplitude peak as a candidate for a match to the corresponding fundamental frequency of interest;
calculating a percent energy value for the amplitude peak;
if the percent energy value of the amplitude peak is greater than a predetermined percentage of a total energy of the periodic information plot, designating the amplitude peak as a candidate for a match to the corresponding fundamental frequency of interest; and
choosing a candidate amplitude peak having a frequency closest to the fundamental frequency of interest as the fundamental fault frequency peak;
remove amplitude peaks at fundamental fault frequencies and at related harmonic frequencies from the periodic information plot;
classify remaining amplitude peaks in the periodic information plot as synchronous periodic peaks and non-synchronous periodic peaks; and
graphically plot the fault frequency family of peaks and the remaining amplitude peaks in the periodic information plot in different colors or different line styles on a display device to identify different groups of frequencies of interest.

\* \* \* \* \*